United States Patent [19]

Johansson

[11] Patent Number: 4,800,650
[45] Date of Patent: Jan. 31, 1989

[54] ANNULAR CIRCULAR SAW BLADE

[75] Inventor: Mats Johansson, Forshaga, Sweden

[73] Assignee: Electrolux Motor Aktiebolag, Huskvarna, Sweden

[21] Appl. No.: 105,590

[22] Filed: Oct. 8, 1987

[30] Foreign Application Priority Data

Oct. 22, 1986 [SE] Sweden ............... 86 04488

[51] Int. Cl.⁴ .................................. B27B 5/14
[52] U.S. Cl. ........................... 30/389; 30/347; 51/168
[58] Field of Search .............. 30/388, 389, 347; 51/168, 73 R; 83/676

[56] References Cited

U.S. PATENT DOCUMENTS 2,472,363  2/1961  Santilli ................... 30/389
4,352,241  10/1986  Johansson ............... 30/389

FOREIGN PATENT DOCUMENTS 60971  9/1982  European Pat. Off. .

Primary Examiner—Douglas D. Watts
Attorney, Agent, or Firm—Armstrong, Nikaido, Marmelstein & Kubovcik

[57] ABSTRACT

The invention relates to an annular circular saw blade (8) with imaginary center axis and with a plane of symmetry (19) which is perpendicular to the imaginary center axis, an inner rim section (14) with a first drive surfaces (22) provided to work in conjunction, through friction coupling, with second drive surfaces (38) on a rotating drive unit (30); an outer rim section (15) with cutting devices and between them a web portion (16) with an underside (17) and a topside (18), with at least one of the said sides (17, 18) exhibiting at least a first annular bearing surface (25) provided to work in conjunction with a second annular bearing surface (45) on a support element (40, 41) for holding the saw blade in position. According to the invention the said first drive surfaces (22) are provided in a groove (20) in the inner rim of the saw blade.

5 Claims, 4 Drawing Sheets

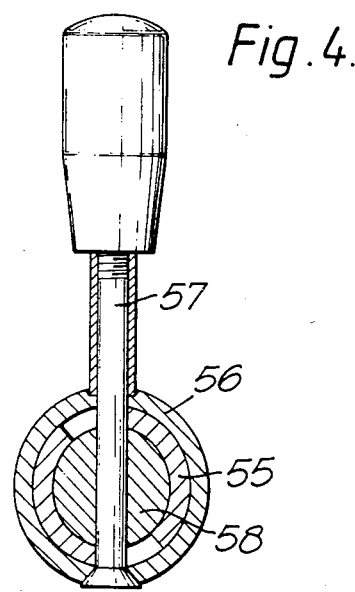
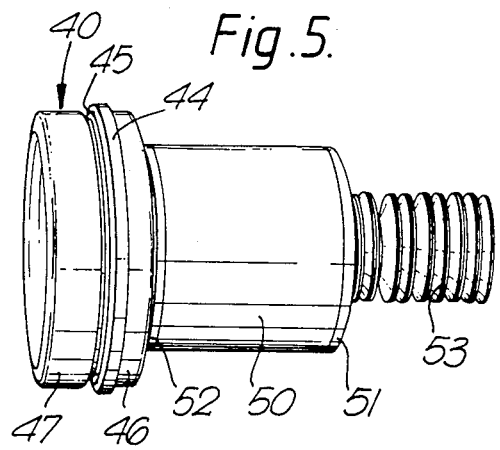
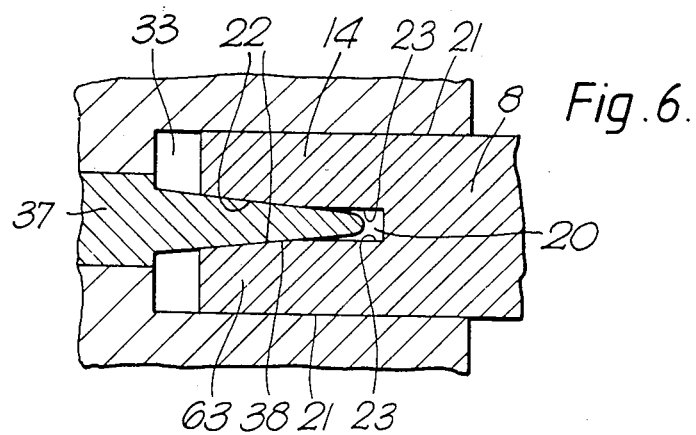

ANNULAR CIRCULAR SAW BLADE

TECHNICAL FIELD

The invention relates to an annular circular saw blade with an imaginary center axis and with a plane of symmetry which is perpendicular to the imaginary centre axis, an inner rim section with first drive surfaces intended to work in conjunction, through friction coupling, with second drive surfaces on a rotating drive unit, an outer rim section with cutting devices and between them a web with an underside and a topside, with at least one of the said sides exhibiting at least a first annular surface of engagement provided to work in conjunction with a second surface of engagement on a support element for holding the saw blade in position.

BACKGROUND ART

An annular circular saw blade of the abovementioned type is known through, for example EP-B-0 036 516. In the embodiment that is described in this patent the first drive surfaces are defined by bevelled surfaces in the inner rim section of the saw blade, so that the rim section decreases in thickness by tapering. This circular saw blade has entailed an important technical advance in relation to older techniques and constitutes for the present, as far as is known, the only annular saw blad existing on the market.

DISCLOSURE OF THE INVENTION

The aim of the invention is to offer an alternative to the saw blade according to the embodiment which is described in the aforementioned EP-B-0 036 516 and this alternative is if possible better than the earlier one. The new saw blade is characterised according to the invention therein that the said first drive surfaces are arranged in a groove in the inner rim of the saw blade. More precisely the first drive surfaces constitute wall zones in the groove. Preferably this wall zone extends with a wedge shape into the rim section of the blade.

In the embodiment which is described in EP-B-0 036 516 the rim section of the blade is gripped between second drive surfaces on the drive unit. In the present form of development the two flanks of the rim section, i.e. the parts above and below the groove in the rim section, are tended to be pulled together instead of being pressed apart. This means that the outer edge zones of the rim section can also be utilised as drive surfaces, here called third drive surfaces, by being pressed against fourth drive surfaces on the drive unit. The said second and third drive surfaces can thus be straight. But one can also imagine these third and fourth drive surfaces being wedge shaped, as in the embodiment according to EP-B-0 036 516, in which case the said first and second drive surfaces can be either wedge-shaped or straight relative to the plane of symmetry of the saw blade.

Further characteristics and aspects of and advantages of the invention will become clear from the following patent claims and also from the following description of a preferred embodiment.

BRIEF DESCRIPTION OF DRAWINGS

In the following description of a preferred embodiment reference will be made to the enclosed drawings, of which FIG. 1 constitutes a perspective view of an annular saw with an annular circular saw blade according to the invention, FIG. 5 shows in greater detail a perspective view of a detail in FIG. 3, and FIG. 6 constitutes a section in a plane coinciding with the imaginary centre axis and with the centre axis for the said drive units and shows the edge zone of the saw blade and adjacent parts of the drive system on a larger scale.

DESCRIPTION OF A PREFERRED EMBODIMENT

Figure 1:
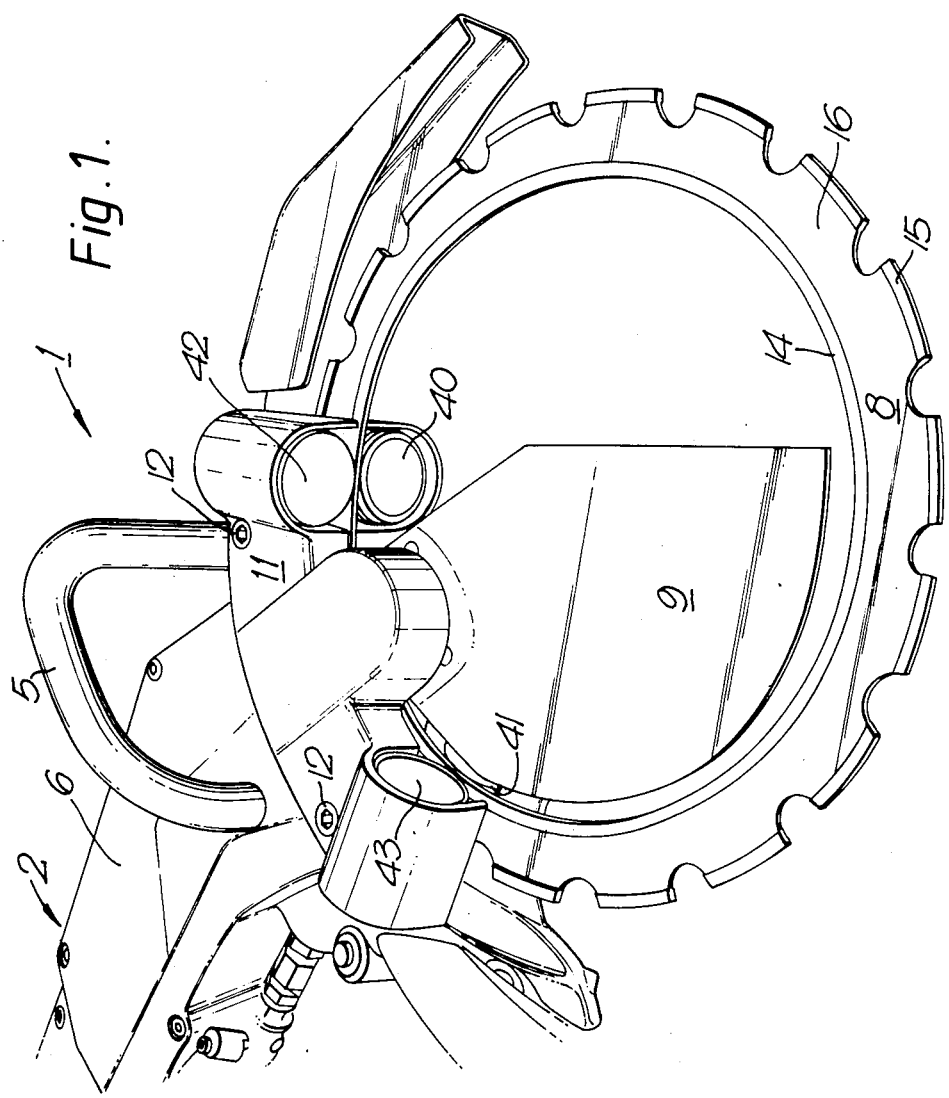
Figure 2:
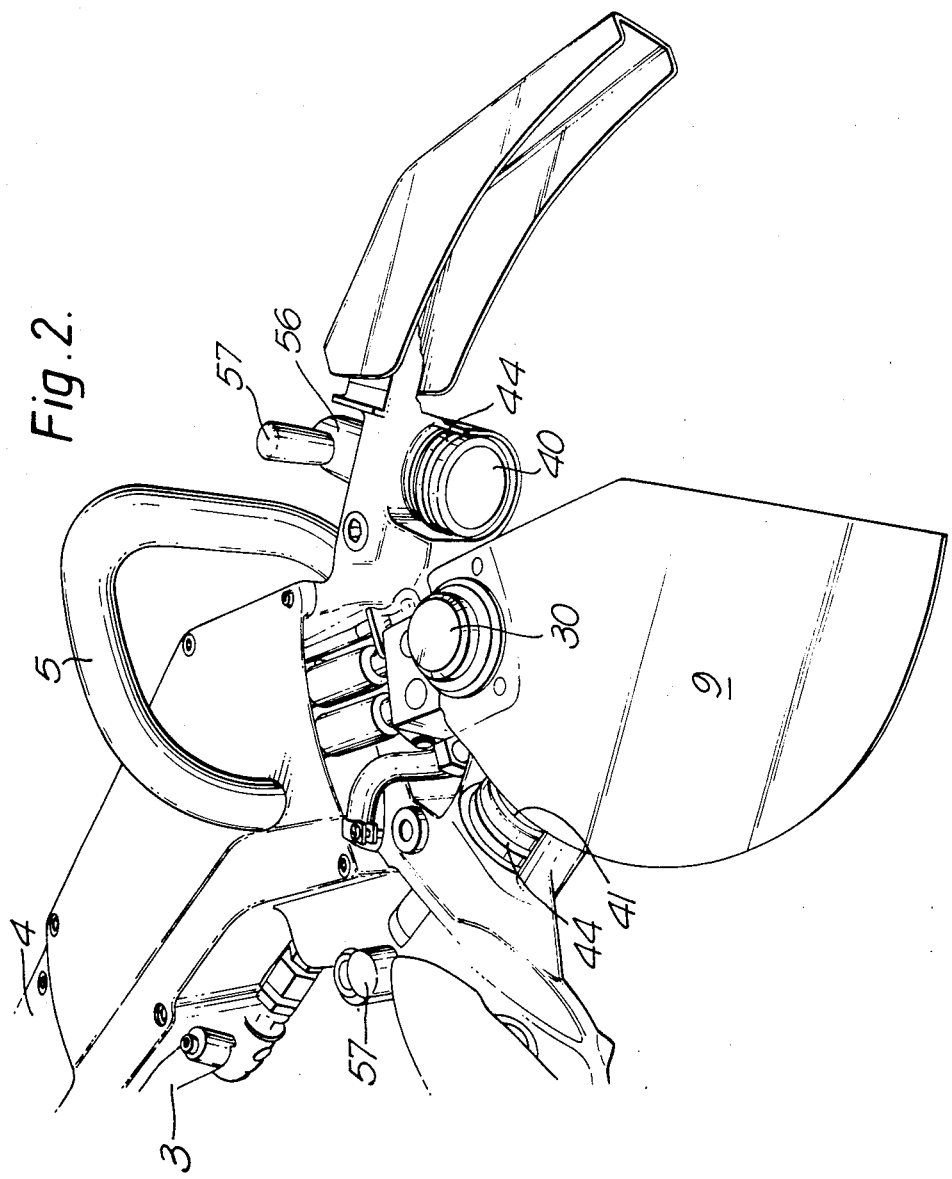
FIG. 2 shows the same saw with the saw blade and certain holding devices removed, FIG. 3 constitutes a section III—III in FIG. 1 showing, partly schematically and with certain parts left out so that what is essential may be better shown, the saw blade and also certain elements working in conjunction with the saw blade, FIG. 4 constitutes a section IV-IV in FIG. 3.
Figure 3:
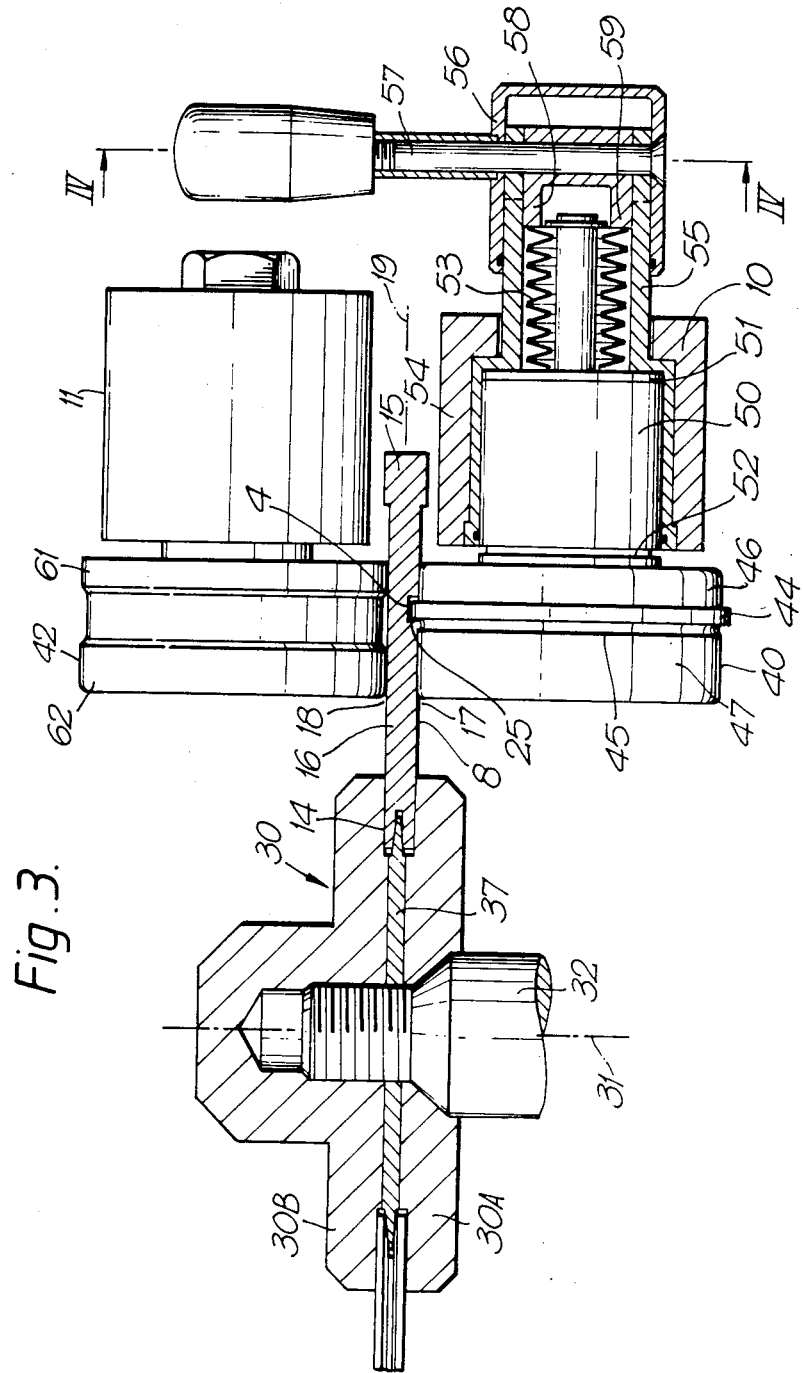

Referring first to FIGS. 1-3 a machine unit of a hydraulically driven annular saw 1 is generally designated 2. The unit 2 comprises a motor housing 6 with a hydraulic motor which is not shown. The hydraulic conduits to the motor have been designated 3. Handles on the machine unit 2 have been designated 4 and 5. The machine unit 2 also includes elements to hold an annular saw blade 8 in place in the machine unit and also a transmission system to transmit the drive power of the engine to the saw blade. A central disc has been designated 9. Forming part of the power unit 2 is a base plate 10 and also a cover 11, which is mounted on the base plate 10 by means of screws 12, so that the cover 11 with the support elements fitted in it for the saw blade 8 can be removed when the saw blade 8 is to be fitted or replaced.

The annular saw blade 8 has an inner rim portion 14, an outer rim portion 15, which is fitted with cutting elements in the form of diamond tipped sectors, and also between the rim sections a web portion 16 with a smooth underside 17 and a smooth topside 18. The sides 17 and 18 are parallel to each other and to a plane of symmetry 19 of the saw blade 8. A groove in the smooth underside 17 of the saw blade 8 has been designated 24. This has a width B and a depth D. An inner edge of the groove 24, which edge is straight, i.e. perpendicular to the plane of symmetry 19, has been designated 25.

A drive pulley on the saw blade 8 has been designated 30. This is fitted mainly inside the annulus of the saw blade 8. It is arranged so as to be able to rotate around an axis of rotation 31 which is parallel to the imaginary centre axis of the saw blade 8. A drive axle has been designated 32, FIG. 3. Other power-transmission devices for transmitting the drive power of the motor to the drive pulley 30 have not been shown. These elements can be conventionally designed. For example elements of the type that are shown in U.S. Pat. No. 4,472,880 can be included.

In the inner rim section 14 of the saw blade, in the edge facing the centre a groove 20 is located, FIG. 6. This groove is wedge shaped and exhibits bevelled surfaces 22 in its outer zone. Inside the bevelled surfaces 22 there are straight, parallel sides 23 which limit the inner zone of the groove 20. The outer surfaces 21 of the edge zone 14 are smooth and constitute extensions of the sides 17 and 18 of the saw blade.

In the drive pulley 30 there is located an annular groove 33, which is the same width as the thickness of the saw blade 8 in the rim section 14 but a little deeper than the width of the said inner rim section 14. In the bottom of the groove 33 there is a ring 37 with wedge shaped section. The sides 38 of this ring in its wedge shaped outer part form drive surfaces for driving the saw blade. These wedge shaped drive surfaces are arranged so as to work in conjunction with the bevelled surfaces 22 in the groove 20 in the inner rim section 14 of the saw blade 8. The ring 37 can for example be made of hard metal and is clamped tight between a lower and an upper pulley element 30A and 30B, so that the part 30A, the ring 37 and the part 30B together form the drive pulley 30.

In the base plate 10 there is mounted a pair of lower running rollers 40 and 41 and in the cover 11 there is mounted a pair of upper running rollers 42 and 42. Each one of the lower running rollers 40 and 41 is fitted with a flange 44 with an inner edge 45 and on opposite sides of the flange 44 a pair of rotation surfaces 46 and 47. The flange 44 has a width b and a height h which are less than the width B and the depth D of the groove in the saw blade 8. The flange 44 is fitted in the track 24, while the support rollers 40, 41 support the saw blade 8 from underneath with the rotation surfaces 46, 47 running against the smooth underside 17 of the saw blade on opposite sides of the groove 24.

An axle journal on each of the lower support rollers 40, 41 is mounted in a ball bearing unit inside a bush 50 with end rings 51 and 52. Outside the outer end ring 52 there is a set of springs 53. The bush 50 with the said ball bearings is fitted in a bearing housing 54 in the base plate 10, while the set of springs 53 is mounted in a tubular, backward projecting sleeve 55. This is fitted on the outside with a thread with very large pitch working in conjunction with a corresponding pitch on the inside of a sleeve nut 56 on the outside of the sleeve 55. The sleeve unit 56 is arranged so as to be able to be rotated a quarter of a turn with the aid of a lever 57. The sleeve nut 56 is linked via the inner part of the lever 57 with a plunger 58 whose inner annular part 59 bears against the set of springs 53. Through turning the lever 57 a quarter of a turn the sleeve nut 56 is displaced inwards towards the base plate 10, at which the springs in the set 53 are tensioned, so that they in their turn develop a force in an axial direction towards the bush 50 and therewith towards the lower support roller 40 in its axial direction. The two lower support rollers 40 and 41 are identically equipped with force-exerting devices of the type described.

The upper support rollers 42 and 43 are mounted in the same manner as the lower support rollers 40 and 41, but are not equipped with any force-exerting devices. The rotation surfaces on the upper support rollers 42, 43 have been designated 61, 62.

In operation, the set of springs 53 is tensioned with the aid of the sleeve nut 56 and the thread on the sleeve 55 working in conjunction. Instead of threads one of the elements can also be equipped with a guiding groove and the other element with a guide pin or similar, working in conjunction with said groove, which gives the same pattern of movement as threads working in conjunction. The set of springs 53 presses the bush in an axial direction towards the imaginary centre axis of the saw blade. The inner edge 45 on the flange 44 on each one of the lower support rollers 40, 41 is thus pressed against the inner edge 25 of the groove 24 in the saw blade 8. This results in its turn in the saw blade 8 being pressed with its inner rim portion 14 into the groove 33 in the drive pulley 30. Through the wedge section between the bevelled surfaces 22 in the track 20 in the inner track 14 of the saw blade 8 and the bevelled surfaces 38 on the ring 37 in the groove 33 in the drive pulley normal forces working against the said second bevelled surfaces 38 are developed which are very large through the wedge action. In this manner a very effective friction grip is achieved between the surfaces 22 and 38 without the exertion of force by the force-exerting devices, i.e. the sleeve 55 and the sleeve nut 56, needing to be particularly large. Otherwise the arrangement shown functions in the same manner as the arrangement which is described in U.S. Pat. No. 4,472,880. The saw blade 8 is thus firmly held between the lower support rollers 40, 41 and the upper support rollers 42, 43 in conjunction with the groove 33, which grips the inner rim portion 14 of the saw blade 8.

In the driving of the saw blade 8 the bevelled surfaces 22 in the track 20 in the saw blade and corresponding bevelled surfaces 38 on the ring 37 form the said first and second drive surfaces. Through the wedge action between the wedge shaped ring 37 and the track 20 the flanks 63 on opposite sides of the track 20 tend to be pressed out. The outer sides 21 in the edge zone 14 are thus pressed towards the inner sides of the groove 33 as a result of which the engagement between the drive pulley 30 and the saw blade 8 is further improved. The said sides 21 and the inner sides of the groove 33 thus form third and fourth drive surfaces.

I claim:

1. Annular circular saw blade (8) with an imaginary centre axis and with a plane of symmetry (19) which is perpendicular to the imaginary centre axis, an inner rim section (14) with first drive surfaces (22) provided to work in conjunction, through friction coupling, with second drive surfaces (38) on a rotating drive unit (30); an outer rim section (15) with cutting devices and between them a web portion (16) with an underside (17) and a topside (18), with at least one of the said sides (17, 18) exhibiting at least a first annular bearing surface (25) provided to work in conjunction with a second bearing surface (45) on a support element (40, 41) for holding the saw blade in place, characterised by the fact that the said first drive surfaces (22) are located in a continuous groove (20) projecting radially inwardly from the inner edge of the inner rim of the saw blade.

2. Saw blade as per claim 1, characterised by the fact that the first drive surfaces are defined by wall zones in the groove.

3. Saw blade as per claim 2, characterised by the fact that the said wall zones in a section coinciding with the plane of symmetry of the blade extend into the rim section of the blade with a wedge shape.

4. Saw blade as per claim 1, characterised by third drive surfaces on the outside of the saw blade in the inner rim section, which third drive surfaces are provided to work in conjunction with fourth drive surfaces on the said drive units.

5. Saw blade as per claim 4, characterised by the fact that the third drive surfaces are defined by bevelled surfaces in the said rim section.

* * * * *